United States Patent [19]

Küpper et al.

[11] Patent Number: 4,615,409
[45] Date of Patent: Oct. 7, 1986

[54] DEVICE FOR SPEED CONTROL OF A MOTOR VEHICLE

[75] Inventors: Rolf Küpper, Soest; Karl-Albert Eckstein, Lippstadt, both of Fed. Rep. of Germany

[73] Assignee: Westfälische Metall Industrie KG, Hueck & Co., Lippstadt, Fed. Rep. of Germany

[21] Appl. No.: 685,337

[22] Filed: Dec. 24, 1984

[30] Foreign Application Priority Data

Dec. 24, 1983 [DE] Fed. Rep. of Germany ....... 3347070

[51] Int. Cl.4 .............................................. B60K 31/00
[52] U.S. Cl. ..................................... 180/176; 74/866; 123/352; 123/399
[58] Field of Search ............... 123/352, 399, 400, 401; 74/865, 866; 180/175, 176, 177, 178, 179

[56] References Cited

U.S. PATENT DOCUMENTS

| 4,072,207 | 2/1978 | Kokubo | 180/175 |
| 4,082,158 | 4/1978 | Carol, Jr. et al. | 180/176 |
| 4,508,078 | 4/1985 | Takeuchi et al. | 123/399 |
| 4,538,571 | 9/1985 | Buck et al. | 123/352 X |

FOREIGN PATENT DOCUMENTS 2509581 10/1975 Fed. Rep. of Germany ...... 180/176
2829894 1/1980 Fed. Rep. of Germany .

Primary Examiner—John J. Love
Assistant Examiner—Michael Mar
Attorney, Agent, or Firm—Horst M. Kasper

[57] ABSTRACT

A speed control device is provided for a motor vehicle allowing the driver to maintain the vehicle at constant speed while still remaining full control with his foot over the acceleration and deceleration of the vehicle. The path of a foot pedal is subdivided into two sections, where the first section corresponds to an acceleration of the motor vehicle and where the second section corresponds to a deceleration of the motor vehicle. A snap-in detention device is provided at the junction point of the two sections such that a foot can rest with a force slightly above the weight of the foot against the foot pedal while the speed of the motor vehicle is maintained constant. The foot pedal is connected to a piston, which in turn is supported by a relatively soft spring. The soft spring is supported by a second piston, which in turn is supported by a harder spring resting against a casing wall. The two pistons are connected to respective potentiometers via sliders and an acceleration control circuit compares the actual acceleration or deceleration with the settings of the potentiometers.

20 Claims, 5 Drawing Figures

DEVICE FOR SPEED CONTROL OF A MOTOR VEHICLE

BACKGROUND OF THE INVENTION

1. Field of the Invention

The present invention relates to a device for speed control of a motor vehicle incorporating an internal combustion engine, which comprises two panel-controlled setting means which provide a signal corresponding to an acceleration and corresponding to a deceleration, an actual value sensor which provides a signal corresponding to the first derivative of the speed of the motor vehicle, a controller comparing the set point and actual values of the acceleration of the motor vehicle and panel control elements where the setting means is constructed and disposed such that the set point zero is present at a certain position of the pedal.

2. Brief Description of the Background of the Invention Including Prior Art

A device of the type set forth above is taught for example in German Patent Application Laid-Open DE-OS No. 2,829,894. The one setting means taught there is associated with the accelerator pedal and provides a signal corresponding to a certain acceleration. The second setting means is associated with the braking pedal of the motor vehicle and provides a signal corresponding to a deceleration. The actual value center can be connected to a velocity speedometer measuring the speed of the vehicle and can provide a time-derivative of the speed via a corresponding differentiation device. No signal is provided by the two setting means if the two pedals are in zero position. Thus the motor vehicle in this position is neither accelerated nor braked but runs with a uniform speed achieved by previous pedal motion.

SUMMARY OF THE INVENTION

1. Objects of the Invention

It is an object of the present invention to improve conventional motor vehicle speed control means which maintains the substantial advantages of the aforementioned device to the driver of a motor vehicle and provides these features also to a motor vehicle controlled solely by the gas pedal, even though the driver can use all the advantages of the conventional type of throttle control of the drive engine.

It is another object of the present invention to increase the comfort of the driver of a motor vehicle by ergonomically useful coordination of the pedal function to the drive dynamics of the vehicle.

It is yet another object of the present invention to decrease the use of fuel in a motor vehicle by providing a control device adapted to furnish a more uniform mode of driving, and which is simple and logically and functionally incorporated into the speed control section of the motor vehicle.

These and other objects and advantages of the present invention will become evident from the description which follows.

2. Brief Description of the Invention

The present invention provides a device for speed control of a motor vehicle with an internal combustion engine. The device comprises a gas pedal, a first setting means having an output and providing a signal corresponding to an acceleration of the vehicle and a second setting means having an output and providing a signal corresponding to a deceleration of the vehicle disposed such that at a certain pedal position the relative set point "0" is present and such that the first and second setting means become effective successively during a motion of said gas pedal over a continuous sequential path. The device also comprises a snap-in lock position for the gas pedal covering said sequential path, an actual value sensor providing a signal corresponding to the first derivative of the velocity of the vehicle with respect to time, a controller having an output and comparing the signals from the outputs of the actual value sensor and from the respective setting means, and a final control element actuated according to the output of the controller.

The present invention also provides a device for speed control of a motor vehicle which may further comprise a first spring corresponding to the path of the gas pedal associated with the first setting means and a second spring corresponding to the path of the gas pedal associated with the second setting means and where the snap-in lock position can be disposed as the area between the two springs. The spring corresponding to the acceleration range of the path of the gas pedal can be associated with a restoring force which is at least about 30 percent higher than the restoring force of the spring associated with a deceleration setting.

A potentiometer which can provide a setting means for the speed control device of the present invention can have its slider position correspond to the motion of the gas pedal in a respective area. A single potentiometer can be employed for covering the two setting means and certain different path areas of the gas pedal can be associated with respective path areas of the slider of the potentiometer.

The device for speed control of a motor vehicle of the present invention can have braking means for the motor vehicle associated with the gas pedal, where the gas pedal can tilt and a pedal path of a first tilting position is associated with the acceleration function and a path of a second tilting position is associated with the deceleration and with the braking function.

The device for speed control of a motor vehicle according to the present invention can further comprise a casing, a second piston connected to the gas pedal, a second spring supporting the second piston, a first piston supporting the second spring and a first spring supporting the first piston against the casing. Such a speed control device can have a snap-in provision maintaining the first spring in its rest position. There can be provided a potentiometer having a slider where the slider is connected to the first piston. There can be a second potentiometer having a slider where the slider is connected to the second piston.

The device for speed control of a motor vehicle according to the present invention can have the range of the angle of the foot pedal corresponding to the second setting means amount to from about 10 to 40 percent of the total range of the effective motion of the gas pedal.

There can be provided a cable bypass of the speed control device running directly from the gas pedal to the throttle flap.

The device for speed control of a motor vehicle according to the present invention can further comprise an automatic control maintaining the speed of a motor vehicle at a desired point without requiring parts of the body of the driver to continuously engage a setting provision and A switch connected to the speed control device and to the automatic control to allow switching over as desired can be provided.

The restoring force of the gas pedal can be adjustable for the path corresponding to the second setting means in order to provide for a force at a junction point between the two paths which is slightly larger than the weight of the part of the driver's foot engaging the gas pedal.

A switch can be connected to the speed control device to allow the switching off the speed control and to enable a direct link to a fuel metering device.

The present invention also provides a method for speed control of a motor vehicle which comprises restoring a pressure of a body member against a setting means member for the speed of a motor vehicle with a second relatively smaller force, retaining the position of the body member upon increasing pressure by the body member with a detention means and restoring an increased pressure by the body member after surpassing of the detention means with a relatively larger force. The relatively larger force can be provided by a first spring, and the relatively smaller force can be provided by a second spring. The detention means can be provided by an elastic mechanical snap-in means. The smaller restoring force can act between a second piston attached to a member to be actuated by the human body and a first piston, and the first piston can be supported by the relatively larger force against a stationary wall surface.

Thus the setting means are disposed such that each of two setting means becomes effective successively during successive areas of the path of motion of one and the same gas pedal. The pedal is provided with a snap-in lock position between the two areas of the path of the pedal. Therefore a single pedal, the gas pedal, is associated with the two setting means which provide both the values for the acceleration and for the delay and which then control the carburetor flap of the Otto-engine or the injection provision of a diesel engine via the control distance. The brake pedal can serve only to provide mechanical braking of the motor vehicle via hydraulic or similar provisions.

If the gas pedal is in the acceleration region, then advantageously the electronics can ensure that the acceleration of the vehicle is always larger than 0.1 m/sec$^2$. The same respective rule can also be associated with the deceleration region of the gas pedal position. In the case of regular acceleration, where the gas pedal does not correspond to a fully open throttle the "kick down" is not turned on.

A disk which is under pressure can be integrated into a gas pedal setting means, which disk pulls the pedal up to the snap-in lock engagement in case of a switched off vehicle. This serves to increase comfort, since then the active gas pedal path covers only the accelerating region.

In addition, a switch can be provided which allows the driver to switch the speed control device of the invention on and off. In case of a switched off speed control device, the base function is performed only by the servo-throttle flap, that is, the gas pedal motion is transmitted by the control device directly to the final control element. The switching on and off can be performed at any time. After starting the engine the speed control device can always be switched on unless it is specifically switched off. Furthermore, the speed control device can be switched off for example if the speed of the motor vehicle is less than about six miles per hour, if it is switched off by the main switch, if the gear shaft of a drive is disposed in the positions N (neutral), P (parking) or R (reverse), and/or the safety function of the electronics switches the automatic speed control are off.

In general, because of safety considerations it is not permissible while driving with the speed control device of the invention to actuate the brake and the gas pedal at the same time. In such a situation, the servo-throttle flap would be switched off automatically.

The functions of a conventional speed control device can be adjusted for example at a turn indicator lever.

In addition, a setting function can be provided, which can be activated starting at about 25 miles per hour. By a short activation of such a setting function, the momentary speed can be stored, and the motor vehicle can be controlled to maintain the speed.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Two setting means provided as potentiometers can be attached to the accelerator pedal. One of the setting means can be associated with acceleration and the second setting means can be associated with braking or removal of fuel. The voltages set with the respective potentiometer are processed by the control system and are used for signals for acceleration or, respectively, deceleration. Advantageously, the two potentiometers are combined to a single unit and a part of the path of the pedal is coordinated to a part of the path of the slider of the potentiometer. A second part of the path of the pedal is associated with a second part of the potentiometer slider. The electronics connected to the output of the potentiometer separates the signals as desired.

Figure 1:
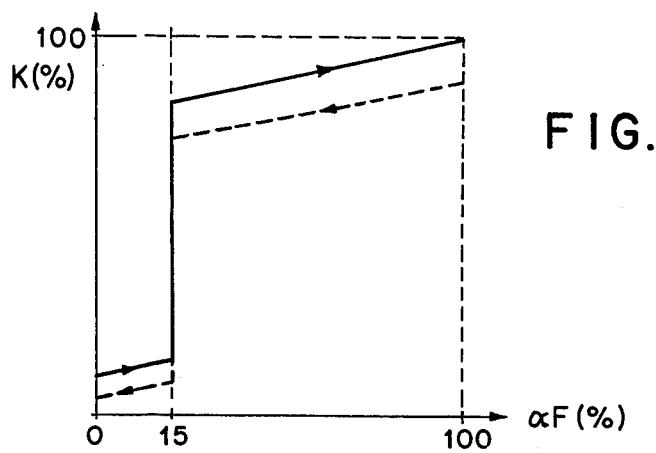
FIG. 1 shows a diagram of the force necessary for the driver to move the pedal.

A snap-in lock position or detention position has to be provided between the path of the two sliders of the potentiometers or, respectively, between the two parts of the path of a single potentiometer slider. For this purpose a restoring force spring of an accelerator pedal can be employed. The snap-in lock position can be formed as a position between two different strong spring forces. In principle, the position of the snap-in lock position can be selected nearly arbitrarily, but, advantageously, it is disposed in the lower region, that is, from about 10 to 40 percent of the path of the pedal and preferably at about 15 to 30 percent of the path of the pedal. Referring now to FIG. 1, there is shown a diagram for the course of the force. The force, K, which has to be provided at the accelerator pedal for example by the foot of the driver, is shown as a percentage depending on the path $\alpha F$ of the accelerator pedal, which again is plotted as a percentage. At 15 percent a step is shown, which can be felt easily by the motor vehicle driver's foot and which serves as a snap-in lock where the driver's foot can rest. The setting means associated with the deceleration can be coordinated to the lower range of the accelerator pedal path, that is, to the region of, say, from 0 to 15 percent, and the remaining path of the accelerator pedal can be connected to the setting means serving to control the acceleration. The condition "acceleration=0" is present at the snap-in lock position, which corresponds to a 15 percent marking. At this point the speed of the motor vehicle is maintained at a constant value.

Thus the driver of the motor vehicle will set the region between 15 and 100 percent of the accelerator pedal path with his foot, where he can select a desired acceleration just as with an accelerator pedal acting immediately on the throttle flap or similar device by providing different pressures on the accelerator pedal. If the desired speed is reached, then the driver allows the accelerator pedal to return just as in the case of an uncontrolled accelerator pedal. The controller controls the acceleration such that it only then becomes zero if the snap-in lock position at the, say, 15 percent marking is reached.

In contrast to the above-mentioned concepts, there is now the substantial difference that the snap-in lock position is not at the zero point of the pedal path but below the snap-in lock position the other setting means is actuated upon further removal of force from the accelerator pedal and thus the transmitting of force from the energy momentum of the vehicle to the drive motor can be controlled. In this area the driver can adjust deceleration values with the foot. In the region of 0 to 15 percent of the accelerator pedal path as set forth in the example, the driver can further look for a position of the foot actuating the accelerator pedal which corresponds to a desired delay as provided by removal of the feeding of gas. If thereby the desired lower speed is reached, then the driver can readjust the accelerator pedal again in the direction of giving gas up to the 15 percent marker such that the motor vehicle continues to run at the velocity reached. If a stronger deceleration is to be achieved, then the brake pedal can be actuated in addition.

The complete course of actuation corresponds fully to the course of actuation in the case of a machine which is not automatically controlled, that is, in the case of a direct connection between the accelerator pedal and the throttle flap or, respectively, the injection provision. Driving with this control concept thus requires no instruction and no learning of new methods. The driver can operate the controlled vehicle just as he would an uncontrolled vehicle, but in addition the comfort of the automatically controlled speed is available in case of interfering influences from outside, that is, for example during driving uphill, in case of opposing winds or the like.

It thus results that in the 15 percent position serving for maintaining the speed constant, the position of the throttle flap or, respectively, of the injection provision, can be different depending on the load resulting from the vehicle.

In contrast to the conventional provision, according to the present invention the acceleration is not directly provided by the selection of the position of the setting means, but a change in the setting means controls a defined throttle flap position starting from an automatically controlled throttle flap position at the 15 percent setting, where the acceleration is equal to zero. It is advantageous in this context that the angular momentum control desired in many cases at the drive shaft remains possible as is the case with an uncontrolled vehicle. This provides the advantages in particular on a flat road and in curves, since in these two cases directed influencing of the drive torque is decisive. The drive torque depends under the precondition of a constant speed of rotation initially only on the position of the throttle flap.

Figure 2:
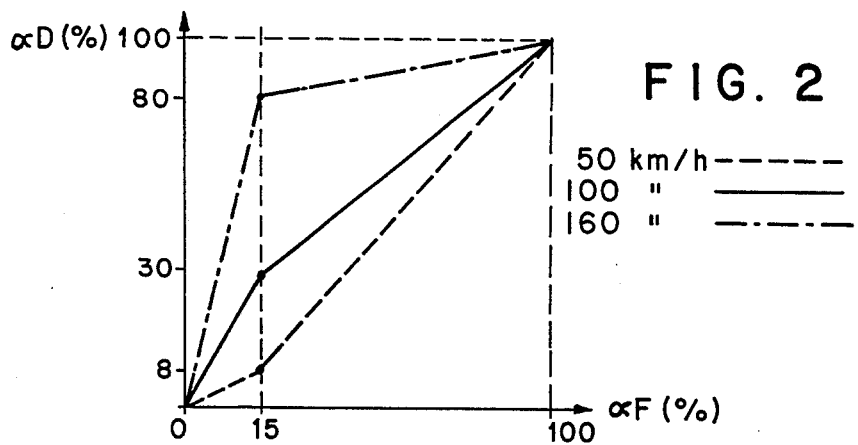
FIG. 2 shows a diagram where the angle of the throttle flap is illustrated as a percentage depending on the angular position of a foot pedal.

A diagram is shown in FIG. 2 where the angle of the throttle flap is illustrated depending on the angular position of the accelerator pedal again as a percentage for three control speeds, that is, 50, 100, 160 kilometers per hour ($\alpha D$ depending on $\alpha F$).

Figure 3:
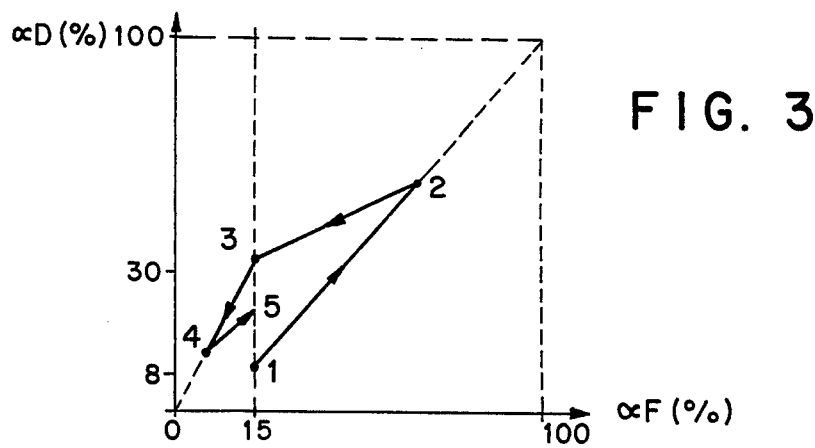
FIG. 3 shows a diagram with the speed change of a motor vehicle by way of example.

A speed change is shown in FIG. 3. The starting point is a constant speed of about 50 kilometers per hour for the motor vehicle. This could correspond to position 1 where the accelerator pedal is in the 15 percent position, the two setting means thus provide no acceleration or, respectively, deceleration signals at the controller. If the driver desires to increase this speed, he pushes the accelerator further as usual and opens the throttle flap according to the diagram of FIG. 1, which can be seen in the characteristic curve resulting for the momentary case, until the desired acceleration or the desired drive torque has been achieved. According to the example, this is reached in the position 2. If the driver has reached the desired speed or approximately reached the desired speed, then as usual in the case of a non-automatically controlled motor vehicle, the foot pedal position is taken back in order to continue drive at a constant speed.

During the entire process after leaving position 1, the condition is imposed on the controller that the acceleration has to be larger than zero. If this condition is maintained until the driver reaches the snap-in lock position, that is, the 15 percent position, then it is clear that upon letting back of the accelerator pedal the position 3 of the throttle flap setting is reached, which again means the condition of acceleration equal to zero and speed equal to a constant. Here the control of the throttle flap according to FIG. 3 is provided between position 2 and 3 with a different characteristic curve than that between position 1 and 2. This is quite natural since for the new higher speed a larger throttle flap opening is required at the 15 percent snap-in lock position for the same accelerator pedal position.

The same procedure can be transferred to a deceleration process. In this case, for example, starting from position 3, the desired deceleration is achieved by returning the accelerator pedal to position 4. In this range of 0 to 15 percent of the accelerator pedal path, the acceleration is negative. The controller turns the throttle flap by a certain predetermined amount of an angle depending on $\alpha F$ in the closing direction. Thus the motor vehicle is delayed by removal of the gas. After achieving the desired lower speed, the driver pushes the accelerator pedal down just as in the case of the uncontrolled conventional vehicle. At the new speed selected by the driver, the driver reaches again the 15 percent position which is the snap-in lock position.

It is a particular advantage of the invention provision that the driver can leave the gas controlling foot as known to him on the accelerator pedal if he drives the vehicle in a controlled way. According to other control concepts, where the preset speeds have to be adjusted on a manual, for example at the dashboard, and the controller then picks up the control of the full operation, there is the danger that the driver interferes in the control process via the accelerator pedal, for example by unintended actuating of a kick down or the like, and therefore he is frequently forced to remove his foot from the accelerator pedal, which can have unpleasant results.

Oppositely, there is of course the possibility with the controller according to the invention to store the adjusted value by setting via a corresponding knob just achieved speed. The driver thus can in the way described above accelerate the motor vehicle to a constant speed desired by him or delay, and then he can actuate the corresponding knob whereupon the foot can be removed from the accelerator pedal. The extinguishing of the thus set speed can be provided in various ways, for example by such a construction that following tipping of the same knob turns off the control process or by having another switch which is connected to the brake or the clutch and which switches off the control process. The throttle flap in this case is run in the empty position. In addition, resumption of the previously stored speed can also be provided, for example by the same knob such that the driver does not have to again actuate the accelerator pedal.

In principle, the invention control means can dispense with an on/off switch of the controller since the actuation and behavior of the motor vehicle are normal to such an extent that there is no reason for driving without control. It is self evident that nevertheless a corresponding safety system can be provided for disturbance and failure of the control mechanism, which in this case connect the foot pedal to the throttle flap directly such that control of the throttle flap is possible via the accelerator pedal. In the case of a regularly controlled way of driving, this mechanism connection is separated and the setting means actuate an electronic controller which in turn actuates a final control motor of electromechanical or also for example pneumatical way, which moves the throttle flap or corresponding members of the fuel injection system of the motor vehicle engine. In addition, an actual value sensor has its output signal fed to the electronic controller, which electronic controller delivers a deviation signal in case the speed should deviate from the set point, while it provides no signal during driving at a constant speed.

In addition, the invention device allows easy change of the conventionally provided two pedal operation (brake pedal and accelerator pedal) into a single pedal operation by providing for example a pedal which can be operated and turned around a rotary axis point near the heel of the driver. The accelerator pedal function is achieved by placing the tiltable pedal on the right side by pressing down this plane, while for braking purposes the pedal is moved to a left stop and has to be pushed down at that location.

Figure 4:
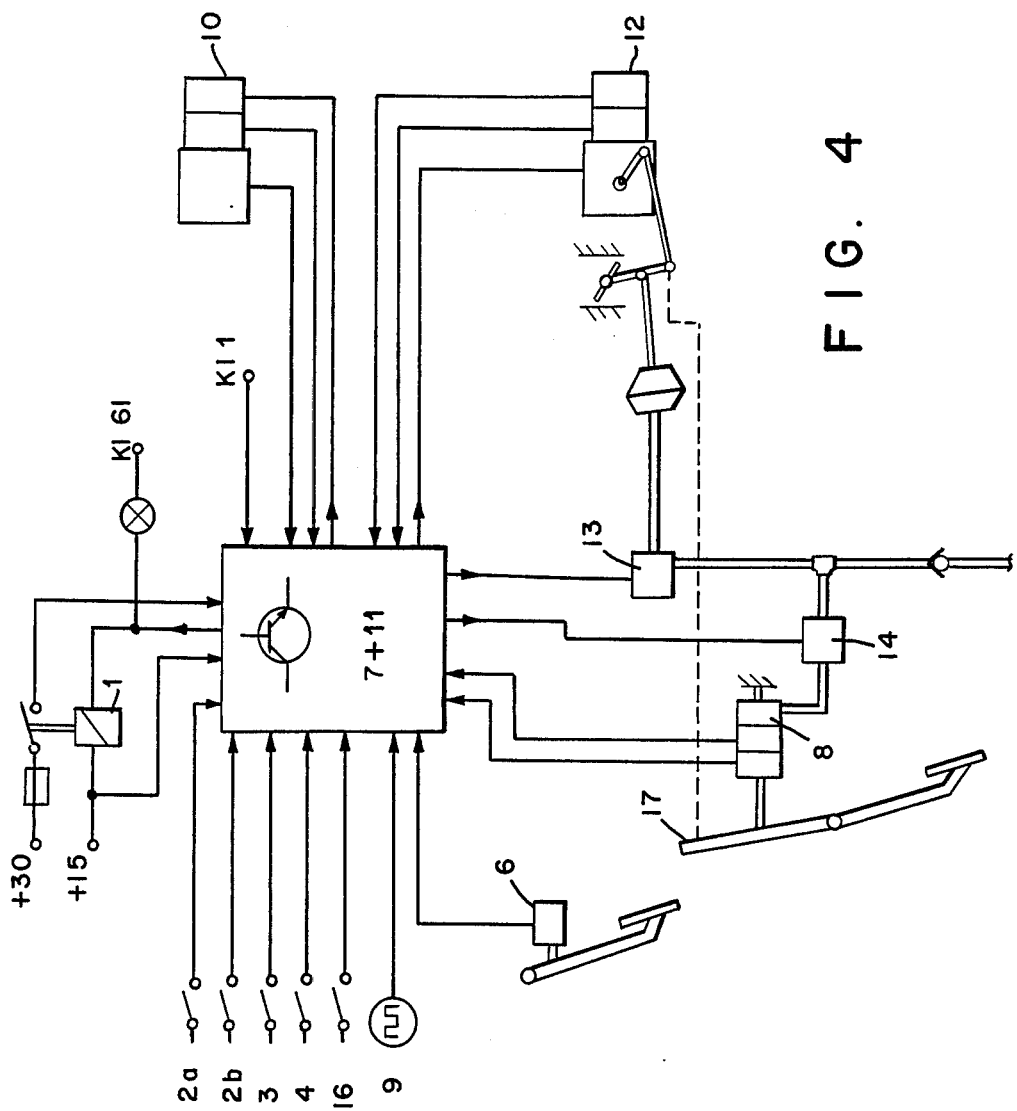
FIG. 4 is a view of the construction of an automatic throttle employing the speed control device of the present invention and FIG. 5 is a sectional view of a spring mechanism embodying the present invention together with a diagram showing the force to be applied by the driver.

Referring now to FIG. 4, there is shown the principle construction of the servo-throttle flap with the device of the present invention. 1 represents a main relay with safety switches. The switches 2a serve to set the device. Switch 2b provides a switching off and resuming the operation of the automatic speed control of the invention. Switch 3 serves to switch on and off the variation of speed and provides for automatic control without foot pedal at certain desired momentary speed. A switch for the gear train is provided at 4. As said above, in case the brake pedal is actuated a switch 6 switches off the automatic speed control device. The accelerator pedal actuates setting means shown at position 8. The overall control apparatus is shown at 7, which can be associated with a power final control element 11. The acceleration of the vehicle can be determined with V-sensor which can comprise an eight pole reed contact which is shown at 9. A final control element for setting the gear transmission is indicated at 10.

A final control element before the throttle is shown schematically at 12. It is actuated by ventilation and reset element 13 which is powered by the power n-stage 11. Ventilation connection to the gas pedal is indicated at 14. 16 shows back brake light switch, and 17 indicates the operating cable.

Figure 5:
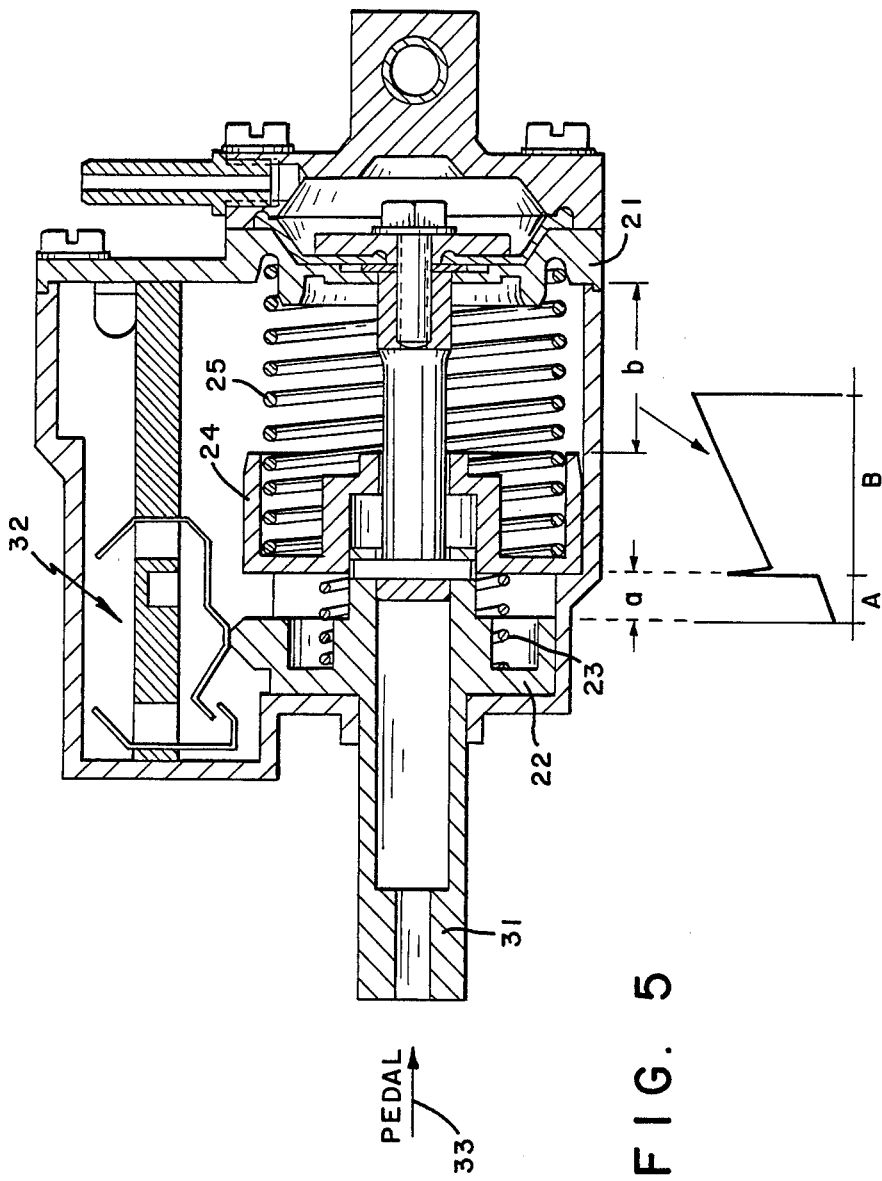

FIG. 5 illustrates the operation of such a device. Shown is a so-called accelerator pedal setting means, where the force exerted on the foot pedal is applied onto a more or less tubular piece 31 in the direction indicated by the arrow 33. A first "piston" 22, which is a rotationally symmetric and substantially piston-shaped part but, however, is not actuated hydraulically or pneumatically, is located in a casing 21. A spring 23 is supported by a second larger "piston" 24, which in turn is supported by a spring 25, which is in turn supported at the bottom of the casing 21. A slider for the potentiometer is moved by the piston 22. The potentiometer is disposed in a side chamber of the casing 21. It can be recognized that the spring 23 is of a smaller dimension than the spring 25.

The path over which the piston 22 can move is indicated by the double arrow a, and the path over which the piston 24 moves is indicated by the double arrow b below the device. A schematic diagram is shown adjacent to the section of the device which shows on the ordinate the force which must be applied to move the pistons versus the distances a and b shown at the abcissa. It can be recognized that the force to be applied is smaller in the region A and larger in the region B, and there is further provided the snap-in lock position where the increase in force is substantial to overcome this position.

The mode of operation is about as follows. If the accelerator pedal is pushed down, initially only the piston 22 moves, since the spring 23 is substantially softer than the spring 25, which can be provided as two springs disposed inside of each other, which is not shown here for purposes of simplicity. If the piston 22 begins to rest on the piston 24, the rest point snap-in lock position for the foot of the driver results and thereafter a substantial increase in the resistance of the accelerator pedal. The potentiometer is subdivided in a corresponding way such that a braking part of the controller is influenced in each case while the other part influences the accelerating part of the controller, as set forth above.

The diagram shows in each case over the path A of the piston 22 and over the path B of the piston 24 the force to be exerted on the accelerator pedal, which indicates upon the contacting of the piston 22 on the piston 24 a substantial increase in the force required to further depress the pedal resulting in a hesitation point, where a further depressing requires a substantial higher force. This can be achieved by providing a mechanical snap-in lock to the first piston at the junction point of the acceleration and deceleration range of the motion of the pedal. At this point the curve plotting the force versus the distance shows a clear peak behavior. After starting the pushing of the first piston, the force required decreases to a level which is above the level required in the second range. In addition, there is a continuously increasing force required the further the pedal is pushed. In summary, the pedal is quite soft initially, but increases its hardness. At the end of this zone it hardens considerably. After overcoming this hardness peak the hardness decreases to a point, which in general is still above the hardness in the initial soft region and the hardness continues to increase with distance.

A potentiometer 32 has its slider connected to the first and/or second piston to transfer the position information into an electrical signal providing a set point. This set point is then compared in a comparator circuit with the amount of the change in speed, i.e. the derivative of the velocity with respect to time.

It will be understood that each of the elements described above, or two or more together, may also find a useful application in other types of devices and methods for speed control of a motor vehicle which differ from the types described above.

While the invention has been illustrated and described as embodied in the context of a device for speed control of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for speed control of a motor vehicle with an internal combustion engine comprising
    a gas pedal;
    a first setting means having an output and providing a signal corresponding to a desired acceleration of the vehicle when the pedal is within an acceleration region;
    a second setting means having an output and providing a signal corresponding to a desired deceleration of the vehicle when the pedal is in a deceleration region;
    a set point "0" at a certain pedal position such that the first and second setting means become effective successively during a motion of said gas pedal over a continuous sequential path covering said regions;
    a snap-in lock position corresponding to the "0" set point for the gas pedal covering said sequential path;
    an actual value sensor providing a signal corresponding to the first derivative of the velocity of the vehicle with respect to time;
    a controller comparing the signals from the outputs of the actual value sensor and from the respective setting means and for producing a controller output signal; and
    a final control element actuated in accordance with the controller output signal for producing the desired acceleration or deceleration of the vehicle.

2. A device for speed control of a motor vehicle according to claim 1 further comprising
    a first spring corresponding to the path of the gas pedal associated with the first setting means; and
    a second spring corresponding to the path of the gas pedal associated with the second setting means.

3. A device for speed control of a motor vehicle according to claim 2 wherein the snap-in lock position is disposed as the area between the two springs.

4. A device for speed control of a motor vehicle according to claim 3 wherein the spring corresponding to the acceleration range of the path of the gas pedal is associated with a restoring force which is at least about 30 percent higher than the restoring force of the spring associated with a deceleration setting.

5. A device for speed control of a motor vehicle according to claim 1 further comprising
    a potentiometer providing a setting means and having its slider position correspond to the motion of the gas pedal in a respective area.

6. A device for speed control of a motor vehicle according to claim 5 wherein a single potentiometer is employed for covering the two setting means and where certain different path areas of the gas pedal are associated with respective path areas of the slider of the potentiometer.

7. A device for speed control of a motor vehicle according to claim 1 further comprising
    braking means for a motor vehicle associated with the gas pedal, where the gas pedal can tilt and where a pedal path of a first tilting position is associated with the acceleration function and a path of a second tilting position is associated with the deceleration and with the braking function.

8. A device for speed control of a motor vehicle according to claim 1 further comprising
    a casing;
    a second piston connected to the gas pedal;
    a second spring supporting the second piston;
    a first piston supporting the second spring; and
    a first spring supporting the first piston against the casing.

9. A device for speed control of a motor vehicle according to claim 8 further comprising
    a snap-in provision maintaining the first spring in its rest position.

10. A device for speed control of a motor vehicle according to claim 9 further comprising
    a potentiometer having a slider where the slider is connected to the first piston.

11. A device for speed control of a motor vehicle according to claim 9 further comprising
    a potentiometer having a slider where the slider is connected to the second piston.

12. A device for speed control of a motor vehicle according to claim 1 wherein the range of the angle of the foot pedal corresponding to the second setting means amounts to from about 10 to 40 percent of the total range of the effective motion of the gas pedal.

13. A device for speed control of a motor vehicle according to claim 1 further comprising
a cable bypass of the speed control device running directly from the gas pedal to the throttle flap.

14. A device for speed control of a motor vehicle according to claim 1 further comprising
an automatic control maintaining the speed of a motor vehicle at a desired point without requiring that parts of the body of the driver engage continuously a setting provision; and
a switch connected to the speed control device and to the automatic control for allowing switching over as desired.

15. A device for speed control of a motor vehicle according to claim 1 wherein the restoring force of the gas pedal is adjustable for the path corresponding to the second setting means in order to provide for a force at a junction point between the two paths, which force is slightly larger than the weight of the part of the driver's foot engaging the gas pedal.

16. A device for speed control of a motor vehicle according to claim 1 further comprising
a switch connected to the speed control device allowing the switching off the speed control and enabling a direct link to a fuel metering device.

17. A method for speed control of a motor vehicle comprising
counter-balancing a pressure of a body member mechanically contacting a pedal setting means member for the speed of a motor vehicle with a second relatively smaller force when the pedal setting means is in a decelerating region;
retaining the position of the pedal setting means upon increasing pressure by the body member with a detention means furnishing locking in a position "0" corresponding to a desired state of constant speed of the vehicle; and
counterbalancing an increased pressure by the body member after surpassing of the detention means with a relatively larger force supporting the pedal setting means while the pedal setting means is in an acceleration region; sensing the pedal setting means position with a sensor; comparing the sensed signal with a reference signal and providing an output signal; and
actuating a final control element in accordance with the output signal for producing a desired acceleration or deceleration of the motor vehicle.

18. The method for speed control of a motor vehicle according to claim 17 wherein the relatively larger force is provided by a first spring and wherein the relatively smaller force is provided by a second spring.

19. The method for speed control of a motor vehicle according to claim 17 wherein the detention means is provided by an elastic mechanical snap-in means.

20. The method for speed control of a motor vehicle according to claim 17 wherein the smaller restoring force acts between a second piston attached to a member to be actuated by the human body and a first piston and wherein the first piston is supported by the relatively larger force against a stationary wall surface.

* * * * *